United States Patent Office 3,236,812
Patented Feb. 22, 1966

3,236,812
INTERFACIAL POLYMERIZATION OF
POLYURETHANES
Wilbur R. McElroy, New Martinsville, W. Va., assignor to Mobay Chemical Company, Pittsburgh, Pa., a corporation of Delaware
No Drawing. Filed Apr. 20, 1962, Ser. No. 188,949
12 Claims. (Cl. 260—75)

This invention relates to the preparation of polyurethane plastics and more particularly to the preparation of linear polyurethane plastics which can be subsequently fabricated into any desired configuration.

It has been previously known to produce polyurethanes which can be subsequently fabricated into the desired configuration by reacting an organic compound containing active hydrogen atoms with an organic polyisocyanate and a chain extending agent to an intermediate state by permitting the solidification of the reaction mass and subsequently, at the desired time, to fabricate the desired article by the application of heat or both heat and pressure. This process has been used for the preparation of both thermoplastic and thermoset type materials depending upon the formulation and the particular reactants used. This process in either event requires a large amount of material handling in that even after reaction is complete, the solidified material must be reduced in particle size before it can be fabricated into the final desired form. It is even necessary in some instances for the material to be pelletized to insure the uniform particle size of the solidified material. This generally requires some sort of extrusion operation.

It has also been known previously to produce polyurethane by reacting bis-chloroformates with diamines. This reaction can be performed either by the melt polymerization technique wherein the reactants are mixed together and caused to react by the application of heat and the introduction of catalysts if necessary or by dissolving the diamine in a water solution and the bis-chloroformate in an organic solvent which is immiscible in the water solution. The reactants, that is, the diamine and bis-chloroformate, react at the interface of the two solutions to produce a polyurethane. This method suffers from the disadvantage that it is somewhat limited in the reactants which can be used in the process, that is, one reactant must be soluble in the water phase, and the other soluble in the organic solvent phase. This method has not found beneficial use in preparing polyurethanes by the polyisocyanate-active hydrogen route. However, where the active hydrogen compound is a low-molecular weight diamine, the polyisocyanate-active hydrogen route has been employed to prepare polyureas by this technique, but has the disadvantage that a side reaction between the isocyanate and water occurs, and the side reaction is catalyzed by the diamine.

It is, therefore, an object of this invention to provide an improved method of making polyurethane plastics. It is another object of this invention to provide an improved method of preparing polyurethane plastics which can be subsequently fabricated into the desired configuration. It is still another object of this invention to provide polyurethane plastics having improved properties and a process of preparation therefor. It is a further object of this invention to provide polyurethanes having improved tear strength, hardness and moduli. It is still another object of this invention to provide a method for preparing polyurethane plastics under mild reaction conditions. It is a further object of this invention to provide a process for making polyurethane plastics wherein the properties of the final product are less sensitive to the stoichiometry of the process. It is another object of this invention to provide a method of preparing polyurethane plastics wherein side reactions are substantially reduced.

The foregoing objects and others which will become apparent from the following description are accomplished in accordance with this invention, generally speaking, by providing a method for preparing polyurethane plastics by reacting at least one organic compound containing at least two groups per molecule containing active hydrogen atoms as determined by the Zerewitinoff test, which active hydrogen atoms are reactive with —NCO groups, with an organic polyisocyanate wherein the reaction is carried out in a liquid which is inert with respect to the reactive components and in which at least one of the reactive components is immiscible and at least one of the other reactive components reactive therewith is miscible. Thus, the invention contemplates reacting at least one compound containing at least two groups per molecule containing active hydrogen atoms with an organic polyisocyanate wherein either at least one of the compounds containing active hydrogen atoms present in the reactive system or the organic polyisocyante is immiscible in an inert liquid while the component which is reactive therewith is soluble in the inert liquid. Therefore, if one of the active hydrogen-containing compounds present in the reactive system is immiscible in the inert liquid the organic polyisocyanate must be at least partially miscible. On the other hand, if the organic polyisocyanate is immiscible, at least one of the active hydrogen-containing compounds must be at least partially miscible in the inert liquid.

For the purpose of illustration, if the isocyanate is miscible in the inert liquid, the reaction is accomplished by adding to the isocyanate liquid solution the component or components containing active hydrogen atoms, agitating the solution to create and maintain a renewed interface, and recovering the insoluble reaction product of the organic compound and the organic polyisocyanate. On the other hand, the diisocyanate may be added to a mixture of the inert liquid and active hydrogen containing components. The inert liquid may be mixed with either or both components prior to mixing and the order of bringing the reactants together is immaterial. The product may be recovered by any conventional technique such as recrystallization, filtration, centrifuging and decanting, distillation and the like depending upon the physical condition of the product. Thus, the reaction of an organic polyisocyanate and an organic compound or mixture of compounds containing at least two groups per molecule containing active hydrogen atoms is conducted at or near the interface created by agitating a two-phase system of either a solution of an organic polyisocyanate in an inert liquid and an active hydrogen compound or compounds, at least one of which is substantially immiscible with the isocyanate-inert liquid solution, or a solution of an active hydrogen compound in an inert liquid and an organic polyisocyanate which is substantially immiscible with the active hydrogen-inert liquid solution.

In accordance with the method of this invention, while either the organic polyisocyanate or one or more organic compounds containing at least two active hydrogen-containing groups in the molecule may be immiscible with the particular inert liquid used, it is the preferred embodiment that the organic polyisocyanate is in solution in a liquid which is inert to the reactants, and at least one compound to be reacted therewith containing active hydrogen atoms is immiscible therewith. Where only one organic compound containing active hydrogen atoms is being reacted with an organic polyisocyanate, it is essential that this compound be substantially immiscible with the isocyanate solution. Where more than one such organic compound containing active hydrogen atoms is used, at least one of these compounds must be immiscible with the polyisocyanate solution. Therefore, compounds which are both miscible and immiscible with the organic polyisocyanate solvent solution may be used in the process of this invention as long as there is always present at least one organic compound containing at least two active hydrogen-containing groups in the molecule which is immiscible in the organic polyisocyanate solvent solution.

Of course, as stated previously, the process also may be conducted by utilizing an organic polyisocyanate which is immiscible in a particular inert liquid used. In this case it is necessary that at least one organic compound containing active hydrogen atoms be used which is miscible in the inert liquid. This embodiment of the invention is particularly important with respect to higher molecular weight —NCO terminated products, such as, for example, —NCO terminated prepolymers which are prepared by reacting an excess of an organic polyisocyanate with a suitable organic compound containing active hydrogen atoms as hereinafter set forth, polyisocyanates prepared by the polymerization of monomeric isocyanate to form uretdiones and isocyanurates, polycarbodiimides produced from polyisocyanates and having terminal —NCO groups and the like.

In accordance with this invention, any suitable organic compound containing at least two groups per molecule bearing active hydrogen atoms as determined by the Zerewitinoff test, which active hydrogen atoms are reactive with —NCO groups may be used in the preparation of polyurethane plastics or in the preparation of —NCO terminated prepolymers in accordance with this invention, such as, for example, both monomeric and polymeric compositions. Any suitable monomeric compound having at least two groups per molecule bearing active hydrogens may be used such as, for example, polyhydric alcohols including such as, for example, ethylene glycol, propylene glycol, 1,4-butanediol, 1,3-butanediol, 1,5-pentanediol and the isomers thereof, 1,6-hexanediol and the isomers thereof, xylylene glycol, diethylene glycol, thiodiglycol, p-phenylene-di-$\beta$-hydroxy-ethyl ether, trimethylol propane, glycerol, sorbitol, tris-(hydroxy-ethoxy) benzene, diethanolamine, triethanol amine, dipropanol amine, tripropanol amine and the like; organic polyamine such as, for example, ethylene diamine, propylene diamine, 1,4-butylene diamine, 1,3-butylene diamine, hexamethylene diamine, methylene-bis-(o-chloro aniline), tolylene diamine, 4,4'-diaminodiphenyl methane, xylylene diamine, 2,4,6-tolylene triamine and the like; amino alcohols such as, for example, amino ethyl alcohol, amino propyl alcohol, amino butyl alcohol and the like; polycarboxylic acids such as, for example, those mentioned hereinafter with relation to the preparation of hydroxyl polyesters; amino acids such as, for example, amino acetic acid, amino propionic acid, amino isovaleric acid, amino valeric acid, amino isocaproic acid, amino caproic acid, amino hydroxyl butyric acid, amino succinic acid and the like.

Any suitable polymeric organic compound containing at least two active hydrogen atoms in the molecule which active hydrogen atoms are reactive with —NCO groups may be used in the process of this invention such as, for example, hydroxyl polyesters, polyesteramides, polyhydric polyalkylene ethers, polyhydric polythioethers, polyacetals and the like.

Any suitable hydroxyl polyester may be used such as, for example, the reaction product of a polycarboxylic acid and a polyhydric alcohol. Any suitable polycarboxylic acid may be used in the preparation of polyesters such as, for example, adipic acid, succinic acid, suberic acid, sebacic acid, oxalic acid, methyladipic acid, glutaric acid, pimelic acid, azelaic acid, phthalic acid, terephthalic acid, isophthalic acid, thiodiglycollic acid, thiodipropionic acid, maleic acid, fumaric acid, citraconic acid, itaconic acid, trimellitic acid, pyromellitic acid, 1,3,5-benzene tricarboxylic acid and the like. Any suitable polyhydric alcohol may be used in the reaction with the polycarboxylic acid to form a polyester such as, for example, ethylene glycol, propylene glycol, hexanediol, bis-(hydroxy methyl cyclohexane), 1,4-butanediol, diethylene glycol, polyethylene glycol, 2,2-dimethyl propylene glycol, xylylene glycol, trimethylol propane, glycerine, castor oil and the like.

Any suitable polyhydric polyalkylene ether may be used such as, for example, the condensation product of an alkylene oxide with a compound containing active hydrogen atoms such as, for example, water, ethylene glycol, propylene glycol, butylene glycol, amylene glycol, trimethylol propane, 1,2,6-hexanetriol, hydroquinone, pyrocatechol, pyrogallol, ammonia, aminoethanol, diethanolamine, triethanolamine and the like. Any suitable alkylene oxide condensate may also be used such as, for example, the condensates of ethylene oxide, propylene oxide, butylene oxide, amylene oxide, styrene oxide and mixtures thereof. The polyalkylene ethers prepared from tetrahydrofuran may be used, such as, polytetramethylene ether glycols. The polyhydric polyalkylene ethers may be prepared by any known process such as, for example, the process described by Wurtz in 1859 and in the "Encyclopedia of Chemical Technology," volume 7, pages 257 to 262, published by Interscience Publishers in 1951, or in U.S. Patent 1,922,459.

Any suitable polyhydric polythioether may be used such as, for example, the reaction product of one of the aforementioned alkylene oxides used in the preparation of the polyhydric polyalkylene ether with a polyhydricthioether such as, for example, thiodiglycol, 3,3'-dihydroxy propyl sulfide, 4,4'-dihydroxy butyl sulfide, 1,4-($\beta$-hydroxyethyl) phenylene dithioether and the like.

Any suitable polyesteramide may be used such as, for example, the reaction product of poly- or di-amine and/or amino alcohol with a carboxylic acid. Any suitable amine such as, for example, ethylene diamine, propylene diamine, ethanolamine, 2,4-toluene diamine, p-phenylene diamine, and the like may be used in the preparation of the polyesteramide. Any suitable polycarboxylic acid may be used such as, for example, those more particularly disclosed above for the preparation of hydroxyl polyesters. Further, a mixture of a glycol and an amino alcohol or polyamine may be used. Any of the glycols mentioned for the preparation of the polyesters may be used.

Any suitable polyacetal may be used such as, for example, the reaction product of an aldehyde and a polyhydric alcohol. Any suitable aldehyde may be used in the preparation of the polyacetal such as, for example, formaldehyde, paraldehyde, butyraldehyde and the like. Any of the polyhydric alcohols mentioned above in the preparation of the hydroxyl polyesters may be used. Any of the polyacetals set forth in U.S. Patent 2,961,428 may be used.

Any suitable organic polyisocyanate may be used in the process of this invention such as, for example, aliphatic, aromatic, alicyclic and heterocyclic polyisocyanates including such as, for example, ethylene diisocyanate, ethylidene diisocyanate, propylene diisocyanate, butylene diisocyanate, cyclopentylene-1,3-diisocyanate, cyclohexylene-1,4-diisocyanate, cyclohexylene-1,2-diisocyanate, 2,4-tolylene diisocyanate, 2,6-tolylene diisocyanate, 4,4'-diphenylmethane diisocyanate, 2,2-diphenylpropane-4,4'-diisocyanate, 3,3'-dimethyldiphenylmethane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenylsulfone-4,4'-diisocyanate, dichlorohexamethylene diisocyanate, tetramethylene diisocyanate, pentamethylene diisocyanate, hexamethylene diisocyanate, 1-chlorobenzene-2,4-diisocyanate, furfurylidene diisocyanate, 2,7-diisocyanatodibenzfuran, 2,4,6-tolylene triisocyanate, 4,4',4''-triphenylmethane triisocyanate, 4,4',4'',4'''-tetraphenylmethane tetraisocyanate and the like. Also suitable as the organic polyisocyanate are the reaction products containing at least two —NCO groups per molecule of any of the above-mentioned monomeric polyisocyanates with any of the previously mentioned active hydrogen containing compounds; higher molecular weight products containing at least two —NCO groups per molecule prepared by the polymerization of polyisocyanate, including dimers and trimers of these compounds such as, for example, N,N'-bis(4'-methyl-3'-isocyanato phenyl) uretdione; the polymer prepared by polymerizing 3 mols of 2,4-tolylene diisocyanate and the like; polycarbodiimides containing at least two —NCO groups per molecule prepared from monomeric polyisocyanates and the like. It is preferred, however, that the aromatic diisocyanates be used.

The quantities of the different reactants, that is, the quantity of the active hydrogen containing material with respect to the quantity of the particular isocyanate used, is not critical, and the reactants will combine very nearly in a stoichiometric relationship. The mechanism of the process is not fully understood, but the results seem to indicate that even if one type of component is in excess in its phase, it is replaced within the reaction zone only as fast as a similar type molecule has reacted. Therefore, the isocyanate to active hydrogen ratio may vary from about 0.5 to 10 or more, depending upon the economics of the situation. It is preferred, however, that the reactants be present in a substantially stoichiometric relationship purely for economic reasons.

The proportion of tri- or higher polyfunctional to difunctional material present in the reaction mixture determines whether or not the product is thermoplastic or themoset, since this controls the amount of cross linking built into the polymer network. As more and more cross linking is built in, the product from any given combination of reactants tends to be less and less thermoplastic. In order to obtain a thermoplastic product, the reactive equivalents of the tri and/or higher functional portion should not exceed about 20% of the total reactive equivalents which are reactive with isocyanate and preferably be in the range of about 0 to 10%.

With respect to the reaction conditions present in carrying out this reaction, any temperature below the decomposition temperature of the product may be used when the compounds are in the liquid state. For example, if the active hydrogen containing compound is a solid at ambient temperatures, a slight amount of heating may be necessary. The preferred temperature range to acquire a reasonable reaction rate for most combinations of reactants without disproportionation of the product is about 20° to 100° C.

In the process of this invention, any suitable compound which is inert to the reactive components, will dissolve one of the reactive components, and is substantially immiscible with at least one of the other reactive components may be used, such as, for example, aliphatic hydrocarbons including such as, for example, propane, propylene, butane, isobutane, isobutylene, 1-butene, 2-butene, n-pentane, n-heptane, n-octane, n-nonane, n-decane and isomers thereof and the like; paraffin oil, 1-pentene, 1-hexene, 1-heptene, 1-octene, 1-nonene, 1-decene and isomers thereof and the like; gasoline, kerosene, diesel fuel oil, solvent naphtha and the like obtained from the distillation of petroleum and having a boiling range within the range of about —15 to 700° F. and the like; aromatic hydrocarbons such as, for example, xylene, octylbenzene, isobutylbenzene, benzene, toluene, naphthalene, styrene, 2-propenyl benzene, divinylbenzene and the like; alicyclic hydrocarbons including such as, for example, cyclohexane, isobutylcyclohexane, cycloheptane, cyclohexene, decahydronaphthalene, dicyclopentadiene and the like; terpenes including such as, for example, p-menthane, pinane, pinene, dipentene, pinol, camphor, turpentine and the like; halogenated hydrocarbons such as, for example, carbon tetrachloride, chloroform, methylene chloride, bromobenzene, ethylene bromide, trichlorofluoromethane and the like; ethers including such as for example, ethyl ether, methyl ethyl ether, dipropyl ether, 2,2'-dichloroethyl ether and the like; esters including such as, for example, ethyl acetate, Cellosolve acetate, dimethylphthalate and the like; ketones including such as, for example, methyl ethyl ketone, acetone, dipropyl ketone, mixtures of the above and the like; sulphur containing compounds including such as, for example, thiophene and its derivatives, thioethers such as, for example, dimethyl thioether, diethyl thioether, dibutyl thioether and the like; alkyl disulfides such as, for example, dimethyl disulfide, diethyldisulfide and the like, alkyl sulfoxides such as, for example, dimethyl sulfoxide, dibutyl sulfoxide, diheptyl sulfoxide and the like, alkyl sulphones including such as, for example, dimethyl sulphone, diethyl sulphone, and the like; organo nitriles such as, for example, acrylonitrile, stearonitrile, isovaleronitrile, acetonitrile and the like; and mixtures of any of the above-mentioned inert compounds. Of course, where the reaction is conducted above the boiling point of the particular inert compound used, pressure may be applied to the system in order to maintain the inert liquid in the liquid state or a suitable reflux condenser may be used to return the condensate to the reactor. It is preferred that aliphatic hydrocarbons be used as the inert liquid.

Of course, as stated previously, it is essential that either one of the active hydrogen containing compounds or the polyisocyanate, but not both, be substantially soluble in the inert liquid while the other is substantially immiscible in the inert liquid solution to form two distinct phases. Thus, one phase is dispersed throughout the other when the system is agitated. It is the preferred procedure that at least one of the active hydrogen containing compounds used in any given formulation is substantially immiscible and the polyisocyanate is in solution with one of the aforementioned inert liquids. Where the components are liquids at ambient temperatures, the reactions may be carried out without the addition of heat. The reaction, therefore, can be carried out anywhere between the melting temperatures of the combination of reaction components and the decomposition temperature of the component or product which decomposes at the lowest temperature. Further, although agitation is not required, it is desirable to create a large number of interfaces, thereby producing a finely divided polymer rather than large masses which are difficult to separate and which entrap reactants, thereby resulting in the loss of yield.

It occurs sometimes that reactive components which individually exhibit immiscibility with a particular inert liquid will form a single phase where the entire reaction components and inert liquid are mixed. In this case, it is either necessary to use a different inert liquid or a lower temperature, or to bring the components together, not all at once, but by degrees to maintain two phases throughout the addition. Thus, it is necessary to maintain two phases in the system over the course of the reaction and at the temperature at which the reaction is conducted.

While the presence of catalysts for the active hydrogen-isocyanate reaction is not required, such accelerators in the system may be used to produce a high molecular weight, non-sticky product in the smallest amount of time. Any suitable catalyst such as, for example, tertiary amines including N-ethyl morpholine, N,N-dimethyl aniline, triethylamine, N,N-diethylcyclohexylamine and the like; metal compounds including stannous oleate, diethyl tin dilaurate, dibutyl tin dilaurate, dimethyl tin di-(2-ethyl hexoate) and the like. Any of the catalysts for promoting the reaction of isocyanate groups with active hydrogen atoms mentioned in a paper entitled "Catalysis of the Isocyanate-Hydroxyl Reaction" by J. W. Britain and P. G. Gemeinhardt, published in the "Journal of Applied Polymer Chemistry," volume IV, Issue No. 11, pages 207 to 211 (1960), may be used. The catalyst should be used in a catalytic amount, however, it is preferred that from about 0.01 to about 1.0% be used based on the weight of active hydrogen-containing compounds in the reaction mixture. It may also be desirable to add certain surface active agents to the reactive system to thereby improve the mixing and contact of the reactants by the formation of smaller droplets. A particularly suitable detergent is sodium lauryl sulfate.

The invention is further illustrated by the following examples in which parts are by weight unless otherwise specified.

*Example 1*

About 51 parts (0.404 equivalent) of 4,4'-diphenylmethane diisocyanate are dissolved in about 500 ml. of Stoddard solvent maintained at a temperature of 70° C. Stoddard solvent is a mixture of hydrocarbons having the following analysis.

Distillation:
| | |
|---|---|
| I.B.P. | 315° F.±5°. |
| 20% | 330° F.±5°. |
| 50% | 340° F.±5°. |
| 80% | 360° F.±5°. |
| E.P. | 390° F. max. |
| Flash point | 100° F. min. |
| Kauri-butanol value | 38 min. |
| Color, Saybolt | 30. |
| Sulfur, $H_2S$/doctor | Sweet. |
| Acidity | Neutral. |
| Paraffins and naphthalenes | 87.7%. |
| Olefins | 0.8%. |
| Aromatics | 11.5%. |

This solution of diisocyanate in Stoddard solvent is added to a mixture of 204 parts (0.204 equivalent) of an hydroxyl polyester prepared by reacting 11 mols of ethylene glycol with 10 mols of adipic acid to an hydroxyl number of about 56 and a molecular weight of about 2,000 and 500 ml. of Stoddard solvent which contains 1 part of stannous octoate. The polyester is substantially immiscible with the Stoddard solvent and is mixed thoroughly therewith at a temperature of about 70° C. to exhibit an emulsion-like appearance. Upon adding the diisocyanate-solvent solution to the polyester mixture, a creamy precipitate separates. After about ten minutes agitation, the precipitate is washed with hexane and dried 20 hours at 70° C. This product indicates a capillary melting point of from about 200° C. (soft) to about 275° C. (liquid) and it may be fabricated by known techniques into the desired final configuration.

*Example 2*

About 146 parts of 4,4'-diphenyl methane diisocyanate (1.168 equivalents) are dissolved in 1,000 ml. of Stoddard solvent heated to a temperature of about 80° C. About 1.0 part of stannous octoate is added thereto and the entire solution is agitated by means of a mixing device. About 200 parts (0.2 equivalent) of the hydroxyl polyester described in Example 1 and 38 parts (0.384 equivalent) of p-phenylene di(β-hydroxy ethyl ether) are heated to a temperature of about 80° C. and then added to the isocyanate-solvent mixture with agitation over a period of about 8 minutes. A uniform finely divided precipitate of polymer is formed. This precipitate is washed once with Stoddard solvent at a temperature of 80° C. and twice with hexane and then dried 18 hours at 70° C. The melting point is 249° C. (soft) to 282° C. (liquid). This powder is compression molded at 380° F. for two minutes at 5,000 p.s.i. to produce a sheet ⅛ inch thick free of bubbles and with the following properties.

| | |
|---|---|
| Tensile p.s.i. | 5700 |
| Elongation percent | 525 |
| Set do | 38 |
| Moduli: | |
| 100% p.s.i. | 1670 |
| 200% p.s.i. | 2170 |
| 300% p.s.i. | 2800 |
| Split tear lb./in. | 470 |
| Shore A hardness | 95 |

*Example 3*

About 161 parts (1.85 equivalents) of an isomeric mixture of 80% 2,4- and 20% 2,6-tolylene diisocyanate and about 1 part of stannous octoate are dissolved in about 1500 ml. of Stoddard solvent which is rapidly agitated at a temperature of about 25° C. Over a period of about two minutes, are added about 38 parts (0.038 equivalent) of a polypropylene glycol having a molecular weight of about 2,000, about 111.7 parts (1.614 equivalents) of dipropylene glycol and about 34.6 parts (0.036 equivalent) of a polyether triol having a molecular weight of about 3,000 and prepared from propylene oxide and glycerine by the condensation of about 50 mols of the former with one mol of the latter to an hydroxyl number of about 56. This entire mixture is rapidly agitated to create an emulsion-like appearance.

A finely divided precipitate is formed as the temperature increases because of the exothermic reaction to about 84° C. in about ten minutes of agitation. The precipitate is washed with hexane and dried under 28 inches of vacuum at about 70° C. for 18 hours and then 110° C. for 4 hours. The dried powder has a melting point of from about 180° C. (soft) to about 197° C. (liquid). A ⅛ inch sheet is prepared by compression molding at 370° F. for five minutes at 5000 p.s.i. This sheet has a hardness of 83 on the Shore D scale.

*Example 4*

A mixture of about 15 parts of trimethylol propane and about 6.4 parts of 1,3-butanediol at a temperature of about 60° C. is added with agitation to a solution prepared by dissolving about 78.6 parts of an isomeric mixture of 80% 2,4-tolylene diisocyanate and 20% 2,6-tolylene diisocyanate in 1,000 parts of Stoddard solvent. The polyol mixture is immiscible with the Stoddard solvent and forms an emulsion-like system when rapidly agitated. A sticky resinous material soon forms and separates from the solvent. This sticky-like resinous material clings to the agitator and to the walls of the vessel. Analysis of the end groups shows that this resin has a molecular weight of about 36,000.

When a small amount of a catalyst such as those mentioned above is added to this system, a solid, particulate, non-sticky product separates from the solution and is readily recovered by filtration.

*Example 5*

About 1100 parts of the polyester of Example 1, about 209 parts of p-phenylene di-(β-hydroxyethyl ether) and about 392.7 parts of 4,4'-diphenylmethane diisocyanate are mixed together with about 425 parts of n-heptane at a temperature of from about 70 to about 80° C. and a two-phase system forms. The —NCO to —OH ratio based on the hydroxyl number of the polyol mixture is about 0.98. A polymer precipitates from the solvent and the solvent is removed therefrom by evaporation. The polymer is dried at about 75° C. for about 18 hours under vacuum. This polymer is a stable hydroxyl terminated gum.

The gum is milled on a two-roll mill and three samples are made therefrom by incorporating therein about 3.0, 5.0 and 7.5 parts of 4,4'-diphenylmethane diisocyanate (MDI) per 100 parts of the gum. Test sheets are prepared by compression molding the gum at 350° F. The properties of each of the samples are set forth as follows:

| | Parts of MDI per 100 parts of Gum | | |
|---|---|---|---|
| | 3 | 5 | 7.5 |
| Tensile, p.s.i. | 5,800 | 7,400 | 6,900 |
| Elongation, percent | 600 | 620 | 440 |
| Moduli: | | | |
| 100%, p.s.i. | 1,270 | 1,300 | 1,440 |
| 200%, p.s.i. | 1,810 | 1,940 | 2,170 |
| 300%, p.s.i. | 2,450 | 2,720 | 3,520 |
| Split tear lb./in. | 600 | 540 | 210 |

Example 6

To a mixture of about 220 parts of 1,5-naphthylene diisocyanate and about 292 parts of n-heptane is added with agitation at 70° C. a polyol mixture of about 1,000 parts of the polyester of Example 1 and about 26.7 parts of 1,4-butane diol. A two-phase system results. The temperature rises to about 98° C. After the polymer forms precipitates, the solvent is removed by evaporation at a temperature below 80° C. This polymer is readily compression molded, injection molded and extruded. The physical properties of a compression molded sheet are:

| | | |
|---|---|---|
| Tensile | p.s.i | 4800 |
| Elongation | percent | 850 |
| Set | do | 65 |
| Moduli— | | |
| 100% | p.s.i | 495 |
| 200% | p.s.i | 680 |
| 300% | p.s.i | 1045 |
| Split tear | lb./in | 240 |
| Shore A hardness | | 70 |

Example 7

To a mixture of about 1050 parts of 4,4'-diphenylmethane diisocyanate in about 1160 parts of isooctanes at a temperature of about 65° C. is added with agitation a mixture of 3500 parts of a polyester prepared by reacting adipic acid with a mixture of equal amounts of ethylene glycol and 1,4-butane diol and about 193.4 parts of 1,4-butane diol. A two-phase system results. The temperature is increased to 99° C. and after the polymer precipitates the solvent is removed by evaporation under reduced pressure. A compression molded sheet of the resulting elastomer has the following properties.

| | | |
|---|---|---|
| Tensile | p.s.i | 5200 |
| Elongation | percent | 800 |
| Set | do | 25 |
| Moduli: | | |
| 100% | p.s.i | 315 |
| 200% | p.s.i | 420 |
| 300% | p.s.i | 590 |
| Split tear | lb./in | 190 |

This procedure may be modified with satisfactory results by adding the MDI to the mixture of polyols in n-hexane.

Example 8

About 140.9 parts of 4,4'-diphenylmethane diisocyanate is dissolved in about 138 parts of isooctane and heated to about 85° C. While the solution is agitated, a mixture of 350 parts of the polyester of Example 1 and 66.5 parts of p-phenylene di-(β-hydroxy ethyl ether) is added. The polyol mixture forms a second phase with the isocyanate solution. The temperature rises to from about 95 to about 99° C. and is held within this range for about 20 minutes after the polyol mixture is added. During this time, an elastomeric product precipitates. The overall —NCO to —OH ratio of the reaction mixture is 1.11 based on the hydroxyl number of the polyol mixture. The elastomeric product is separated from the isooctane by evaporation of the latter under vacuum at about 80° C. A compression molded sheet of the elastomer gives the following physical properties.

| | | |
|---|---|---|
| Tensile | p.s.i | 8300 |
| Elongation | percent | 600 |
| Set | do | 25 |
| Moduli: | | |
| 100% | p.s.i | 1320 |
| 200% | p.s.i | 1920 |
| 300% | p.s.i | 2810 |
| Split tear | lb./in | 560 |
| Shore A hardness | | 94 |

In comparison, when the same reactants in substantially stoichiometric quantities are mixed together with MDI at 80° C., without the presence of an immiscible solvent which forms an interface between any of the reactants which are reactive toward each other, a product is formed which has lower tensile strength, moduli and tear strength and higher permanent set than this material. The properties for a material so prepared are set forth as follows.

| | | |
|---|---|---|
| Tensile | p.s.i | 4400 |
| Elongation | percent | 600 |
| Set | do | 45 |
| Melting point | ° C | 197 |
| Moduli: | | |
| 100% | p.s.i | 1150 |
| 200% | p.s.i | 1550 |
| 300% | p.s.i | 2050 |
| Split tear | lb./in | 300 |
| Shore A hardness | | 92 |

Example 9

The procedure of Example 8 is followed with the exception that the 4,4'-diphenylmethane diisocyanate is added just above its melting point and added to the polyol mixture and about 138 parts of n-heptane which has been heated to about 85° C. The results are similar to those obtained when the polyol mixture is added to the diisocyanate-inert liquid mixture.

Example 10

To a solution of about 732.8 parts of 4,4'-diphenylmethane diisocyanate in about 1360 parts of n-hexane is added with agitation and at room temperature about 979.0 parts of a mixture of an hydroxyl polyester having an hydroxyl number of about 56 and 1,4-butane diol in the ratio of 4.34. The hydroxyl polyester is the reaction product of adipic acid and 1,4-butane diol. This polyol mixture forms a second phase in the n-hexane. The overall —NCO to —OH ratio based on the hydroxyl number of the polyol mixture is 1.2. The temperature rises to the boiling point of n-hexane and is maintained at this level for about one hour after the polymer precipitates. Thereafter, the polymer is filtered, washed once with hexane and dried under vacuum for about 16 hours at about 70° C. A compression molded sheet gives the following physical properties:

| | | |
|---|---|---|
| Tensile | p.s.i | 5700 |
| Modulus, 100% | p.s.i | 2750 |
| Split tear | lb./in | 760 |
| Shore B hardness | | 77 |

The procedure of this example may also be altered by adding the MDI to a mixture of the polyols and n-hexane giving satisfactory results.

Example 11

To a solution of about 405 parts of 4,4'-diphenylmethane diisocyanate in 1360 parts of n-hexane is added with agitation at room temperature about 981 parts of a mixture of the polyester of Example 10 and 1,4-butane diol in the ratio of 11.1. The polyol mixture forms a second phase in the isocyanate solvent solution. The temperature rises to the boiling point of n-hexane which is about 68° C. and is held at this temperature for about 3.5 hours after the elastomer has precipitated. Thereafter, the elastomer is washed with n-hexane and dried under vacuum at about 75° C. The overall —NCO to —OH ratio of the reaction mixture is 1.2 based on the hydroxyl number of the polyol mixture. A compression molded sheet gives the following physical properties:

| | | |
|---|---|---|
| Tensile | p.s.i | 6300 |
| Elongation | percent | 600 |
| Split tear | lb./in | 400 |
| Shore B hardness | | 63 |

The procedure may be altered with good results by adding the MDI to a mixture of the polyols and n-hexane.

Example 12

The procedure of Example 11 is followed with the exception that about 2.45 parts of stannous octoate are added to the 4,4'-diphenylmethane diisocyanate-n-hexane solution before the addition of the mixture of polyols is made. Physical properties of a compression molded sheet prepared using the elastomer which precipitates from the solution are as follows:

| | |
|---|---|
| Tensile _____ p.s.i__ | 2700 |
| Elongation _____ percent__ | 530 |
| Split tear _____ lb./in__ | 410 |
| Shore B hardness _____ | 63 |

Example 13

The procedure of Example 10 is followed with the exception that about 2.45 parts of stannous octoate are added to the 4,4'-diphenylmethane diisocyanate-n-hexane solution prior to the addition of the polyol mixture. Physical properties of a compression molded sheet prepared from the elastomer precipitated are as follows:

| | |
|---|---|
| Tensile _____ p.s.i__ | 4900 |
| Moduli, 100% _____ p.s.i__ | 2130 |
| Split tear _____ lb./in__ | 680 |
| Shore B hardness _____ | 80 |

Example 14

To a mixture of about 1250 parts of 4,4'-diphenylmethane diisocyanate in about 1360 parts of isooctane at about 85° C is added with agitation a mixture of about 500 parts of the polyester of Example 10 and about 405 parts of 1,4-butanediol. This polyol mixture is insoluble in isooctane. The polymeric product starts to precipitate in from 5 to 10 minutes. After about one hour from the time the product starts to precipitate the polymer is removed from the reactor and dried by evaporation of the solvent under vacuum at temperatures of from about 80° C. to about 110° C. The polymer has a melting range of from about 220° C. to about 270° C. An injection molded sheet prepared from the product has a tensile strength of 9900 p.s.i. and a Shore D hardness of 84. The molded sheet could not be shattered by striking it with a hammer.

Example 15

An —NCO terminated prepolymer containing 6.3% —NCO is prepared by reacting about 100 parts of an hydroxyl polyester having a molecular weight of about 2,000, an hydroxyl number of about 56 and an acid number less than 1 with about 40 parts of 4,4'-diphenylmethane diisocyanate at a temperature of about 125° C. The hydroxyl polyester is prepared by condensing about 1 mol of adipic acid with about 1.09 mols of ethylene glycol at a temperature of about 200° C. for about 35 hours. The hydroxyl polyester is dehydrated by heating it to a temperature of about 125° C. for about one hour after completion of the reaction.

A suspension is prepared by adding about 100 parts of this isocyanate-modified polyester to about 44 parts of xylene at about 42° C. The isocyanate-modified polyester is substantially insoluble in the xylene. While the mixture is agitated about 10.4 parts of dipropylene glycol is added thereto. Dipropylene glycol is soluble in xylene. After the polymeric product begins to precipitate the mass is heated to about 99° C. in about 45 minutes and held at this temperature for about 1 hour. Thereafter, the elastomeric polymer is separated by evaporating the solvent under vacuum at a temperature not exceeding 80° C. A compression molded sheet has a Shore A hardness of 42, a tensile strength of 1460 p.s.i., a 300% modulus of 250 p.s.i. and an elongation of 1500%.

Example 16

To a solution of 2300 parts of isomeric mixture of toluylene diisocyanate composed of about 80% 2,4- and 20% 2,6-toluylene diisocyanate in 1330 parts of n-heptane is added while agitating a mixture of about 2300 parts of the hydroxyl polyester of Example 1 and about 1035 parts of 1,4-butane diol. A two-phase system results. The temperature rises to about 98° C. and after the polymer precipitates the n-heptane is removed by evaporation at a temperature below about 80° C. A compression molded sheet of the elastomer has the following physical properties.

| | | |
|---|---|---|
| Tensile _____ p.s.i__ | | 6400 |
| Elongation _____ percent__ | | 395 |
| Set _____ do____ | | 3 |
| Moduli: | | |
| 100% _____ p.s.i__ | | 2350 |
| 200% _____ p.s.i__ | | 2600 |
| 300% _____ p.s.i__ | | 3660 |
| Split tear _____ lbs./in__ | | 740 |
| Shore D hardness _____ | | 67 |

This procedure may also be altered without change in the physical properties of the product by adding the isomeric mixture of isocyanates to a mixture of the polyols and n-heptane.

Example 17

To a solution of about 596 parts of an isomeric mixture of 80% 2,4- and 20% 2,6-toluylene diisocyanate in 850 parts of n-heptane at room temperature is added about 0.1 part of dibutyltin dilaurate as a catalyst followed by a mixture of about 432.4 parts of dipropylene glycol, about 288 parts of a triol having a molecular weight of about 3,000 and prepared by reacting glycerine and propylene oxide and about 4.32 parts of trimethylol propane while agitating the reacting mixture. The polyol mixture forms a second phase when mixed with the isocyanate-heptane solution. The temperature quickly rises to about 68° C. and remains at this temperature for about 1 hour after the polyol mixture is added. During this time, the polymeric product precipitates out. Thereafter, the polymer is dried by evaporation of the solvent under vacuum at a temperature of from about 70° C. to about 110° C. The polymer has a melting range of about 165° C. to about 191° C. A compression molded sheet prepared from this polymer is water-white and optically clear and exhibits a Shore D hardness of 82 and a tensile strength of about 5900 p.s.i.

This procedure can be altered by adding the isomeric mixture of isocyanates to the mixture of polyols, catalysts and n-hexane to give comparable results.

Example 18

The procedure of Example 1 is followed with the exception that the temperature is maintained at about 80° C. and about 255 parts of 4,4'-diphenyl methane diisocyanate are used in place of the 51 parts used in Example 1. This gives an —NCO/OH of 10. The melting point of this product is 220° C. (soft) to 295° C. (liquid).

It is pointed out that the examples set forth herein are for the purpose of illustration and not limitation and that any of the ingredients set forth above such as the organic compounds containing active hydrogen atoms, the organic isocyanates and the chain extenders can be used in place of the particular ones used in the examples.

Although the invention has been described in considerable detail for the purpose of illustration, it is to be understood that variations may be made by those skilled in the art without departing from the spirit of the invention and the scope of the claims.

What is claimed is:

1. A method for preparing polyurethane plastics which comprises reacting at the interface of a two-phase system an organic polyisocyanate with at least one organic compound containing at least two hydroxyl groups, said reaction being conducted in an inert liquid as the sole medium for the reactants, said inert liquid being substantially immiscible with at least one of said reactants, and in which one of the other said reactants is substantially soluble and recovering the reaction product.

2. A method for preparing polyurethane plastics which comprises reacting at the interface of a two-phase system an organic polyisocyanate with at least one organic compound containing at least two hydroxyl groups, said reaction being conducted in an inert liquid as the sole medium for the reactants, said inert liquid being substantially immiscible with at least one of said reactants and in which one of the other said reactants is substantially soluble to form a two phase system, agitating the two phase system to continuously create new interfaces between the immiscible components and recovering the reaction product.

3. A process for preparing polyurethane plastics which comprises reacting at the interface of a two-phase system an organic polyisocyanate with an organic compound containing at least two hydroxyl groups per molecule, said polyisocyanate being dissolved in an organic liquid inert with respect to said reactants and immiscible with said organic compound containing hydroxyl groups to form a two-phase system, said inert liquid being the sole medium for said reactants, and recovering the reaction product.

4. A process for preparing polyurethane plastics which comprises reacting at the interface of a two phase system an organic polyisocyanate with an organic compound containing at least two hydroxyl groups per molecule, said polyisocyanate being dissolved in an organic liquid inert with respect to said reactants and immiscible with said organic compound containing hydroxyl groups to form a two phase system, said inert liquid being the sole medium for said reactants, agitating the said system to continuously create new interfaces and recovering the reaction product.

5. The process of claim 3 in which a catalyst for the active hydrogen atom-isocyanate reaction is present in at least one of the phases of the two phase system.

6. A process for preparing polyurethane plastics which comprises reacting at the interface of a two phase system an organic polyisocyanate with an organic compound containing at least two hydroxyl groups per molecule, said organic compound containing hydroxyl groups being dissolved in an organic liquid inert with respect to said reactants and immiscible with said organic polyisocyanate to form a two phase system, said inert liquid being the sole medium for said reactants, and recovering the reaction product.

7. A process for the preparation of polyurethane plastics which comprises reacting at the interface of a two phase system an organic compound containing at least two hydroxyl groups per molecule selected from the group consisting of hydroxyl polyesters prepared by reacting a polycarboxylic acid and a polyhydric alcohol, polyhydric polyalkylene ethers, polyhydric polythioethers and polyacetals and a chain extending agent having reactive hydrogen atoms selected from the group consisting of hydroxyl groups, amino groups and carboxylic acid groups, said polyisocyanate being dissolved in an organic liquid inert with respect to said reactants and immiscible with said organic compound containing at least two hydroxyl groups to form a two-phase system, said inert liquid being the sole medium for said reactants, and recovering the reaction product.

8. A process for preparing polyurethane plastics which comprises reacting at the interface of a two phase system an aromatic polyisocyanate with an organic compound containing at least two hydroxyl groups per molecule, said polyisocyanate being dissolved in an organic liquid inert with respect to said reactants and immiscible with said organic compound containing hydroxyl groups to form a two phase system, said inert liquid being the sole medium for said reactants, and recovering the reaction product.

9. A process for preparing polyurethane plastics which comprises reacting at the interface of a two phase system an organic polyisocyanate selected from the group consisting of tolylene diisocyanate and 4,4'-diphenylmethane diisocyanate with an organic compound containing at least two hydroxyl groups per molecule which are reactive with an —NCO group, said polyisocyanate being dissolved in an organic liquid inert with respect to said reactants and immiscible with said organic compound containing hydroxyl groups to form a two phase system, said inert liquid being the sole medium for said reactants, and recovering the reaction product.

10. A method for preparing polyurethane plastics which comprises reacting an organic polyisocyanate with at least one organic compound containing hydroxyl groups, said reaction being conducted at the interface in an inert fluid which forms two phases when mixed with said reactants, one of said phases comprising at least one of the reactants, the other phase comprising the inert fluid containing at least one different reactant, said inert liquid being the sole medium for said reactants, agitating the two phases to continuously create new interfaces and recovering the reaction product.

11. The process of claim 10 wherein said organic compound containing hydroxyl groups is a mixture of a polyhydric polyalkylene ether and a glycol and said polyisocyanate is tolylene diisocyanate.

12. The process of claim 10 wherein said organic compound containing hydroxyl groups is a mixture of a glycol and an hydroxyl polyester prepared by reacting a dihydric alcohol with a dicarboxylic acid and said polyisocyanate is 4,4'-diphenylmethane diisocyanate.

References Cited by the Examiner

UNITED STATES PATENTS

| 2,284,637 | 6/1942 | Catlin | 260—77.5 |
| 2,511,544 | 6/1950 | Rinke et al. | 260—77.5 |
| 2,929,800 | 3/1960 | Hill | 260—77.5 |
| 2,987,494 | 6/1961 | Black | 260—77.5 X |

FOREIGN PATENTS

| 538,977 | 4/1957 | Canada. |

OTHER REFERENCES

Morgan: "Interfacial Polycondensation," SPE Journal, June 1959, pages 485–495.

LEON J. BERCOVITZ, *Primary Examiner.*

DONALD E. CZAJA, *Examiner.*